United States Patent
Meissner et al.

(10) Patent No.: US 10,828,769 B2
(45) Date of Patent: Nov. 10, 2020

(54) ASCERTAINING AN INPUT COMMAND FOR A ROBOT, SAID INPUT COMMAND BEING ENTERED BY MANUALLY EXERTING A FORCE ONTO THE ROBOT

(71) Applicant: KUKA Deutschland GmbH, Augsburg (DE)

(72) Inventors: Christian Meissner, Leipzig (DE); Holger Mönnich, Friedberg (DE); Tobias Reichl, Munich (DE); Shahin Osama, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 330 days.

(21) Appl. No.: 15/744,173

(22) PCT Filed: Jul. 11, 2016

(86) PCT No.: PCT/EP2016/001187
§ 371 (c)(1),
(2) Date: Apr. 2, 2018

(87) PCT Pub. No.: WO2017/008898
PCT Pub. Date: Jan. 19, 2017

(65) Prior Publication Data
US 2018/0200880 A1    Jul. 19, 2018

(30) Foreign Application Priority Data
Jul. 14, 2015   (DE) .................. 10 2015 009 151

(51) Int. Cl.
*B25J 9/00* (2006.01)
*B25J 9/16* (2006.01)
*G05B 19/423* (2006.01)

(52) U.S. Cl.
CPC .......... *B25J 9/0081* (2013.01); *B25J 9/1656* (2013.01); *G05B 19/423* (2013.01);
(Continued)

(58) Field of Classification Search
CPC ........ A61B 2034/301; A61B 2034/302; A61B 2034/305; A61B 2090/065; A61B 34/30;
(Continued)

(56) References Cited

U.S. PATENT DOCUMENTS 4,925,312 A * 5/1990 Onaga .................... B25J 9/1633
                                                        318/568.22
5,781,705 A * 7/1998 Endo ...................... B25J 9/1643
                                                        318/568.22
(Continued)

FOREIGN PATENT DOCUMENTS

DE         69622572 T2     4/2003
DE     102008027008 A1    12/2009
(Continued)

OTHER PUBLICATIONS

Vukobraatovic et al., Contact control concepts in manipulation robotics/spl minus/an overview, 1994, IEEE, p. 12-24 (Year: 1994).*
(Continued)

*Primary Examiner* — McDieunel Marc
(74) *Attorney, Agent, or Firm* — Dorton & Willis, LLP

(57) ABSTRACT

A method for automatically ascertaining an input command for a robot, wherein the input command is entered by manually exerting an external force onto the robot. The input command is ascertained on the basis of the joint force component attempting to cause a movement of the robot in only one robot joint coordinate sub-space which is specific to the input command. The joint forces are imprinted with the external force.

17 Claims, 2 Drawing Sheets

(52) U.S. Cl.
CPC .............. G05B 2219/36418 (2013.01); G05B 2219/36429 (2013.01); G05B 2219/36432 (2013.01); G05B 2219/39439 (2013.01); G05B 2219/40367 (2013.01); Y10S 901/04 (2013.01); Y10S 901/41 (2013.01)

(58) Field of Classification Search
CPC ......... A61B 34/35; A61B 34/37; A61B 34/71; A61B 34/77; A61B 90/361; A61B 90/37; B25J 3/00; B25J 9/1682; B25J 9/1689; B25J 9/0081; B25J 9/1656; G05B 2219/39135; G05B 2219/39212; G05B 2219/39322; G05B 2219/40184; G05B 2219/45117; G05B 19/423; G05B 2219/36418; G05B 2219/36429; G05B 2219/36432; G05B 2219/39439; G05B 2219/40367; Y10S 901/04; Y10S 901/41

See application file for complete search history.

(56) References Cited

U.S. PATENT DOCUMENTS

| | | | |
|---|---|---|---|
| 6,507,163 B1* | 1/2003 | Allen ................. | B25J 9/162 14/78 |
| 6,786,896 B1* | 9/2004 | Madhani ............. | B25J 9/1615 606/1 |
| 8,004,229 B2* | 8/2011 | Nowlin ............... | A61B 34/35 318/568.21 |
| 9,724,827 B2* | 8/2017 | Ueberle ............... | B25J 9/1643 |
| 9,889,565 B2* | 2/2018 | Lundberg ............ | B25J 9/1697 |
| 2005/0131582 A1* | 6/2005 | Kazi .................. | B25J 9/1697 700/259 |
| 2005/0222714 A1 | 10/2005 | Nihei et al. | |
| 2007/0120512 A1* | 5/2007 | Albu-Schaffer ...... | B25J 13/085 318/568.2 |
| 2011/0040305 A1* | 2/2011 | Gomez ................ | B25J 9/1656 606/130 |
| 2011/0190932 A1 | 8/2011 | Tsusaka et al. | |
| 2014/0052152 A1* | 2/2014 | Au .................... | A61B 34/10 606/130 |
| 2014/0081461 A1* | 3/2014 | Williamson ......... | B25J 9/1643 700/261 |
| 2014/0276954 A1* | 9/2014 | Hourtash ............. | B25J 9/1607 606/130 |
| 2015/0013492 A1* | 1/2015 | Oka .................... | B25J 9/0084 74/490.05 |
| 2015/0127151 A1* | 5/2015 | Riedel ................ | B25J 9/1643 700/250 |
| 2015/0148958 A1* | 5/2015 | Primessnig .......... | B25J 9/1676 700/255 |
| 2017/0217028 A1* | 8/2017 | Stockschlaeder .... | B25J 9/0096 |

FOREIGN PATENT DOCUMENTS

| | | |
|---|---|---|
| DE | 102008062622 A1 | 6/2010 |
| DE | 102013010290 A1 | 12/2014 |
| DE | 102013218823 A1 | 4/2015 |
| DE | 102013222456 A1 | 5/2015 |
| EP | 2131257 A1 | 12/2009 |
| EP | 2868445 A1 | 5/2015 |
| WO | 2014043702 A1 | 3/2014 |

OTHER PUBLICATIONS

Chiaverini et al., The parallel approach to force/position control of robotic manipulators, 1993, IEEE, p. 361-373 (Year: 1993).*

Khatib, A unified approach for motion and force control of robot manipulators: The operational space formulation, 1987, IEEE, p. 43-53 (Year: 1987).*

Khatib et al., Motion and force control of robot manipulators, 1986, IEEE, p 1381-1386 (Year: 1996).*

Luh et al., Industrial robots with seven joints, 1985, IEEE, p. 1010-1015 (Year: 1985).*

Caccavale et al., Kinematic control of a seven-joint manipulator with non-spherical wrist, 1995, IEEE, p. 50-55 (Year: 1995).*

European Patent Office; Search Report in related International Patent Application No. PCT/EP2016/001187 dated Sep. 21, 2016; 6 pages.

German Patent Office; Office Action in related German Patent Application No. 10 2015 009 151.4 dated Feb. 12, 2016; 5 pages.

* cited by examiner

ASCERTAINING AN INPUT COMMAND FOR A ROBOT, SAID INPUT COMMAND BEING ENTERED BY MANUALLY EXERTING A FORCE ONTO THE ROBOT

CROSS-REFERENCE

This application is a national phase application under 35 U.S.C. § 371 of International Patent Application No. PCT/EP2016/001187, filed Jul. 11, 2016 (pending), which claims the benefit of German Patent Application No. DE 10 2015 009 151.4 filed Jul. 14, 2015, the disclosures of which are incorporated by reference herein in their entirety.

TECHNICAL FIELD

The present invention relates to a method for automatically determining an input command for a robot, which is input by manually exerting an external force on the robot; a method for the manually guided movement of the robot, wherein a thus determined movement command is executed; a robot controller and a computer program product for implementing any of the methods, as well as a robot assembly with the robot controller.

BACKGROUND

A method for the manually guided adjustment of the pose or movement of an industrial robot is known from DE 10 2013 21 823 A1, in which a guiding force applied to the robot by an operator is recorded and the drives of the robot are controlled in a force-controlled manner in such a way that an adjustment of a robot-fixed reference takes place only within the degree of freedom of a reference coordinate system, in the direction of which the guiding force has its greatest force direction component.

As a result, for example by appropriately strong vertical pulling downwards and subsequent horizontal pushing predominantly in one of two coordinate axis directions of the reference coordinate system, the TCP can be moved exactly, first in the direction of the vertical x-axis and then exactly in the direction of the horizontal y- or z-axis in a hand-guided manner.

WO 2014/043702 A1 proposes a compliant control, in which spring forces of a virtual restraint to a canonical pose are projected into the null space of the kinematically redundant robot.

SUMMARY

The object of the present invention is to improve a command input for a robot by manually exerting an external force on the robot, in particular a manually guided movement of the robot.

This object is achieved by a method, a robot controller for implementing the method, and a robot assembly with the robot controller or a computer program product for implementing the method described herein.

According to one aspect of the present invention, an input command for a robot, which is input to the robot by manually exerting an external force on the robot, is determined automatically on the basis of the component of the joint forces impressed by the external force, which seeks to effect or effects a movement of the robot only in a subspace of the joint coordinate space of the robot which is specific to this input command, or an input command for a robot, which is input to the robot by manually exerting an external force on the robot, is determined automatically on the basis of a or the component of the joint forces impressed by the external force seeking to effect or effecting a movement of the robot only in a subspace of the joint coordinate space of the robot which is specific to this input command.

In particular the force acting in a joint of the robot or a torque or an axial torque acting in the joint can be understood as the joint force. Torques or axial torques in the joints can expediently be recorded or measured by means of torque sensors in the joints.

The subspace of the joint coordinate space expediently comprises a smaller dimension than the joint coordinate space. A joint coordinate space of a 7-axis articulated robot can have seven dimensions, for example; while one of the corresponding subspaces for an input command comprises six, five, four, three, two or preferably only one dimension(s).

Due to the determination on the basis of the joint forces or their components, in one exemplary embodiment of the present invention, the same physical dimensions can advantageously be taken as a basis; whereas, in the initially cited DE 10 2013 218 823 A1 for example, due to the projection into the working space [N] and [Nm], they have to be compared and appropriately weighted.

In one exemplary embodiment, the determination on the basis of the joint forces or their component can additionally or alternatively be performed more precisely and/or more reliably than in the working space; due to the sensitivity in the Jacobian matrix that exists there, in particular in the vicinity of singular poses.

The determination on the basis of the joint forces or their component can additionally or alternatively be advantageous in an exemplary embodiment in the case of redundancies, in particular kinematically redundant robots with at least seven joints and/or working spaces with less than six dimensions. The projection into the working space in the initially cited DE 10 2013 218 823 A1 results in an information reduction. In particular, in one exemplary embodiment, a deliberate movement of the robot by manual guidance in the kinematic null space can advantageously be detected via the determination on the basis of the joint forces or its component, and thus in particular the risk of an incorrect interpretation of the manual guidance can be reduced.

In one exemplary embodiment, the robot comprises at least three, in particular at least six, in particular at least seven joints, in particular actuatable or actuated joints, in particular joints, in particular pivot joints, which are actuatable or actuated by means of at least one respective electric drive, in particular electric motor, as well as links, which are respectively connected to one another by one of said joints, in particular a base, a carousel, a rocker, an arm, a hand, a (tool) flange and/or an end effector. The same three-dimensional location and orientation of an end-link with different poses or joint positions can advantageously be represented by a robot with at least seven joints or (movement) axes, thus allowing the selection of advantageous, for example collision-free, poses.

In one exemplary embodiment, for the purpose of determining an input command, in particular for manually guided movement, the robot is controlled by manually exerting an external force on the robot in a yieldable, in particular gravitationally compensated, manner, in particular position and/or force-controlled, in particular admittance or impedance-controlled, for example as described in the initially cited DE 10 2013 218 823 A1 or WO 2014/043702 A1, to which reference is additionally made in full.

For a more compact description, antiparallel force pairs, i.e. torques, are generally also referred to as forces in the customary manner.

In the present case, in particular in the customary manner, joint forces are understood to be forces, in particular torques, which act in a joint or between two links of the robot connected by the joint, in particular in or on an actuator or drive of the joint. The weight force of a horizontally held arm, for example, impresses a corresponding joint force in the proximal pivot joint of said arm in the form of a holding torque, or an external force manually applied to said arm in a vertically downward direction impresses a corresponding (additional) torque.

In one exemplary embodiment, the joint forces impressed by the external force that are used, or rather the component of which is used, to determine the input command, can include, or in particular be, joint forces in all, in particular actuatable or actuated, joints of the robot, or also (only) joint forces in a (real) subset of said joints. In the present case, the component of the joint forces that seeks to effect a movement of the robot (only) in an input command-specific subspace of the joint coordinate space of the robot is in particular understood to be the component of the joint forces that (only) works towards a movement of the robot in said input command-specific subspace. In the sense of the present invention, therefore, the horizontal component of a force on a block, which displaces the block on a horizontal plane, for example, seeks to effect a movement of the block in the horizontal plane, while, in the sense of the present invention, the vertical component of the force, which presses the block against the plane, seeks to effect a vertical movement of the block towards the plane.

In one exemplary embodiment, in the customary manner, the joint coordinate space of the robot is the (mathematical) space opened by the joint coordinates of the robot and bounded by the joint coordinate regions; in the case of a seven-axis or a seven jointed articulated or pivot joint robot, for example, the seven-dimensional space of the joint angles $q_1, \ldots, q_7$.

In one exemplary embodiment, an input command to be determined comprises a movement command for moving the robot in the input command-specific subspace; it can in particular be such a movement command, in particular a command for a translational displacement in a specified direction or plane and/or a rotation about one or more specified axes. In one exemplary embodiment, the robot can thus be manually guided by manually exerting an external force on the robot, in particular as a function of, in particular proportional to, a magnitude of the external force, in particular the component of the external force in a specified direction or plane and/or about a specified axis or as a function of, in particular proportional to, a magnitude of the component of the joint forces impressed by this external force in the input command-specific subspace.

Additionally or alternatively, an input command to be determined can also influence or command other actions of the robot, for example an activation and/or deactivation of a robot-guided tool, a storage of a pose ("touch-up") or the like.

In one exemplary embodiment, the input command is determined as an input command to be executed only, or always executed (only), if the component of the joint forces impressed by the external force in the input command-specific subspace exceeds a predetermined threshold value. The risk of an unintentional incorrect input, in particular, can thus advantageously be reduced. In a further development, the threshold value can be variably specified or set by the user. It can thus advantageously be adapted to different operating conditions.

In one exemplary embodiment, two or more different input commands can selectively be input, for each of which different input command-specific subspaces of the joint coordinate space are specified. These input commands are in particular movements in different subspaces, etc. In particular then, in an execution of two or more (possible or selectable) input commands with different subspaces of the joint coordinate space specific to the respective input command, the input command is determined as the entered input command, in the input command-specific subspace of which the joint forces impressed by the external force have the larger, in particular the largest, component.

In one exemplary embodiment, the magnitude of the component can be determined by means of a standard, in particular an amount standard or a maximum standard, in particular an (amount or maximum) standard over the component, in particular the component that is scaled with the magnitude of the joint forces, or over a difference between the component and the magnitude of the joint forces.

In the present case, for a more compact description, no command or a non-command, in particular the command to not move or to hold a pose of the robot, is generally understood to also be one of at least two possible input commands to enter, i.e., in addition to at least one active command, for example a movement in a specified subspace, the set of possible input commands also includes the element "no command", in particular "no movement". In particular in one exemplary embodiment, when the component of the joint forces in the subspace assigned to said non-command is the largest, it can consequently be recognized that the user does not wish to enter a command; any occurring external forces therefore do not serve the desired command input and are thus ignored.

In one exemplary embodiment, an input command-specific subspace of the joint coordinate space of the robot is a, or the, kinematic null space of the robot, in which the robot can be moved without changing its end-link position. An end-link position can be defined by six coordinates, for example; specifically three position coordinates and three orientation coordinates, which indicate the orientation in which the end-link is positioned in the space. An articulated robot with six joints comprises a one-to-one allocation between the joint positions and the six coordinates of the end-link position. In contrast, an articulated robot with seven joints comprises a one-dimensional kinematic null space. The fact that this kinematic null space is one-dimensional means that the axial positions of the seven joints are a function of a single parameter. Said parameter can thus be changed and the axial positions of the joints, preferably of all seven joints, change in such a way, that the six coordinates of the end-link position remain constant, i.e. the end-link does not move in the space. An end-link position can also be defined only by the three position coordinates, for example. An articulated robot with six joints then correspondingly comprises a three-dimensional kinematic null space; an articulated robot with seven joints comprises a four-dimensional kinematic null space.

The input command-specific subspace can therefore be a movement space of the robot, which can be parameterized by means of a number of parameters that is smaller than the number of joints of the robot. The input command-specific subspace of a six-axis articulated robot can in particular have two, three, four or five dimensions, and can be parameterized by the same number of parameters. The input command-specific subspace of a seven-axis articulated robot can correspondingly have two, three, four, five or six dimensions, and can be parameterized by the same number of parameters. The variation of one or more parameter(s) of the input command-specific subspace can preferably lead to a change in the axial positions of multiple joints, preferably more joints than parameters that have been changed, and in particular of all joints. For example, the change of the single parameter of a one-dimensional input command-specific subspace can lead to a change of the axial positions of two, three, four, five, six, seven or more joints, in particular all joints of the robot. In addition to rotational joints of an articulated robot, a joint can also be understood to mean translational joints, i.e. joints that allow a linear displacement, such as linear axes, on which in particular an articulated robot can be mounted.

In one exemplary embodiment, therefore, a purely or predominantly manually guided null space movement of the robot can advantageously be used for command input, for example the placement of an elbow of a seven-axis articulated robot such as the KUKA LBR iiwa.

Additionally or alternatively, in one exemplary embodiment, one or more input command-specific subspaces of the joint coordinate space of the robot can (respectively) be specified by means of a restricted movement capacity of the robot (pre)defined by a user, in particular a robot-fixed reference such as, in particular, the tool center point (TCP), in a working space of possible poses of the robot, in particular in a working space of possible, in particular three-dimensional, locations or distances to a reference system and/or, in particular three-dimensional, orientations or rotations about, in particular three, axes relative to a reference system, in particular the EULER or Cardan angles, of the reference.

In one exemplary embodiment, one or more restricted movement capacities and/or input command-specific subspaces can be predefined by the user, in particular from predefined movement capacities or subspaces, in particular from a predefined library.

In particular, in one exemplary embodiment, the or a user-defined restricted movement capacity (capacities) can comprise, in particular be, an, in particular pure or exclusive, translation along an, in particular straight, curve, in particular along a coordinate axis of the reference. As a result, in one exemplary embodiment, the robot can advantageously be moved precisely along the curve, in particular in the direction of the coordinate axis, in a manually guided manner.

Additionally or alternatively, in one exemplary embodiment, the or one of the user-defined restricted movement capacity (capacities) can comprise, in particular be, an, in particular pure or exclusive, translation on or in an, in particular flat, three-dimensional surface, in particular a coordinate plane (opened by two coordinate axes) of the reference. As a result, in one exemplary embodiment, the robot can advantageously be moved precisely along the surface, in particular parallel to a coordinate (axis) plane, in a manually guided manner.

Additionally or alternatively, in one exemplary embodiment, the or one of the user-defined restricted movement capacity (capacities) can comprise, in particular be, an, in particular pure or exclusive, rotation about one, two or three, in particular perpendicular, axes, in particular coordinate axes of the reference. As a result, in one exemplary embodiment, the robot can advantageously be rotated precisely about one or more axes of rotation, in particular coordinate axes, in a manually guided manner.

In particular, in one exemplary embodiment, the or one of the user-defined restricted movement capacity (capacities) can comprise, in particular be, a translation along a straight line, in particular a coordinate axis of the reference, and a rotation or torsion about this straight line and/or one or two, in particular perpendicular to said straight line and/or to one another, axes, in particular one or two (further) coordinate axis of the reference. As a result, in one exemplary embodiment, a robot-guided tool, in particular a (minimally invasive) surgical instrument, can advantageously be pushed through a Cardanic point, in particular a trocar point, in a four-dimensional manner and twisted about said point.

In one exemplary embodiment, the joint forces impressed by the external force are determined. In a further development, these joint forces are determined on the basis of a model or on the basis of a (mechanical or mathematical replacement) model of the robot and/or on the basis of forces recorded in joints of the robot, in particular on the basis of a difference between, in particular directly, in particular by means of sensors, or indirectly, in particular on the basis of currents, voltages, outputs of the drives, etc., recorded active (total) joint forces and joint forces, in particular gravitational, frictional, inertial and/or process forces, determined or estimated on the basis of the model. Except for model errors, these differences then correspond to the forces (not depicted in the model), which are (additionally) impressed in the joints as a result of the (manually exerted) external force on the robot.

In one exemplary embodiment, the component of the joint forces impressed by the external force, which seeks to effect or effects a movement of the robot only in a predetermined subspace of the joint coordinate space of the robot specific to this input command, is determined on the basis of a mathematical projection of the joint forces in the subspace, in particular on the basis of a pseudoinverse, in particular the Moore-Penrose pseudoinverse. As a result, in particular in the case of kinematically redundant robots, the higher dimensional, in particular at least seven-dimensional, joint forces can advantageously be projected in a lower-dimensional subspace. In one exemplary embodiment, the number of dimensions of the input command-specific subspace or subspaces is generally lower than that of the joint angle space; in one exemplary embodiment, the number of dimensions of one or more of the subspaces is lower than six.

As discussed above, in particular movement commands for the hand-guided movement of the robot, which for this purpose is preferably controlled in a yieldable manner, can advantageously be input by means of a method described here. According to one aspect of the present invention, a movement command, which is input by manually exerting an external force on the robot, is correspondingly determined automatically according to a method described here and subsequently executed, in particular by, on the basis of the component of the joint forces impressed by the external force, in particular proportional to the magnitude and/or direction thereof, determining a target movement, in particular a target movement direction, target movement speed and/or target position to be approached, and/or corresponding target driving forces of the robot, and relaying this information to the drives or actuators.

According to one aspect of the present invention, a robot controller has the hardware and/or software or is programmed to execute a method described here, and/or comprises:

Means for automatically determining a or the input command, in particular a movement command, for a or the robot, which is input by manually exerting an external force on the robot, on the basis of the component of the joint forces impressed by the external force, which seeks to effect or effects a movement of the robot only in a subspace of the joint coordinate space of the robot which is specific to this input command;

Means for comparing the component with a predetermined threshold value and determining the input command as an input command to be implemented, if the component exceeds a predetermined threshold value;

Means for comparing the components of the joint forces in at least two subspaces of the joint coordinate space specific to different input commands, and for determining the entered input command to be the input command, in the input command-specific subspace of which the joint forces impressed by the external force have the larger, in particular the largest, component;

Means for specifying, in particular selecting, at least one input command-specific subspace of the joint coordinate space of the robot by specifying, in particular selecting, a user-defined restricted movement capacity of the robot, in particular a robot-fixed reference, in a working space of possible poses of the robot, in particular in a working space of possible locations and/or orientations of the reference;

Means for determining the joint forces impressed by the external force, in particular on the basis of a model and/or recorded forces in joints of the robot;

Means for determining the component of the joint forces impressed by the external force, which seeks to effect or effects a movement of the robot only in a predetermined subspace of the joint coordinate space of the robot specific to this input command, on the basis of a mathematical projection of the joint forces in the subspace, in particular on the basis of a pseudoinverse; and/or Means for executing the determined movement command, in particular by commanding or actuating the drives or actuators of the robot.

A means in the sense of the present invention can be hardware and/or software, in particular an in particular digital processing, in particular microprocessing, unit (CPU) which is preferably data or signal-connected to a memory and/or bus system, and/or comprise one or more programs or program modules. The CPU can be configured to process commands, which are implemented as a program stored in a memory system, and to acquire input signals from a data bus and/or send output signals to a data bus. A memory system can comprise one or more, in particular different, storage media, in particular optical, magnetic, solid-state and/or other non-volatile media. The program can be designed in such a way that it embodies or is capable of executing the methods described here, so that the CPU can execute the steps of such methods and is thus in particular capable of determining the input command and in particular controlling the robot accordingly.

According to one aspect of the present invention, a robot assembly comprises a here-described robot and a here-described robot controller, which controls, in particular adjusts, the robot, in particular according to a here-described method, or is configured to do so.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
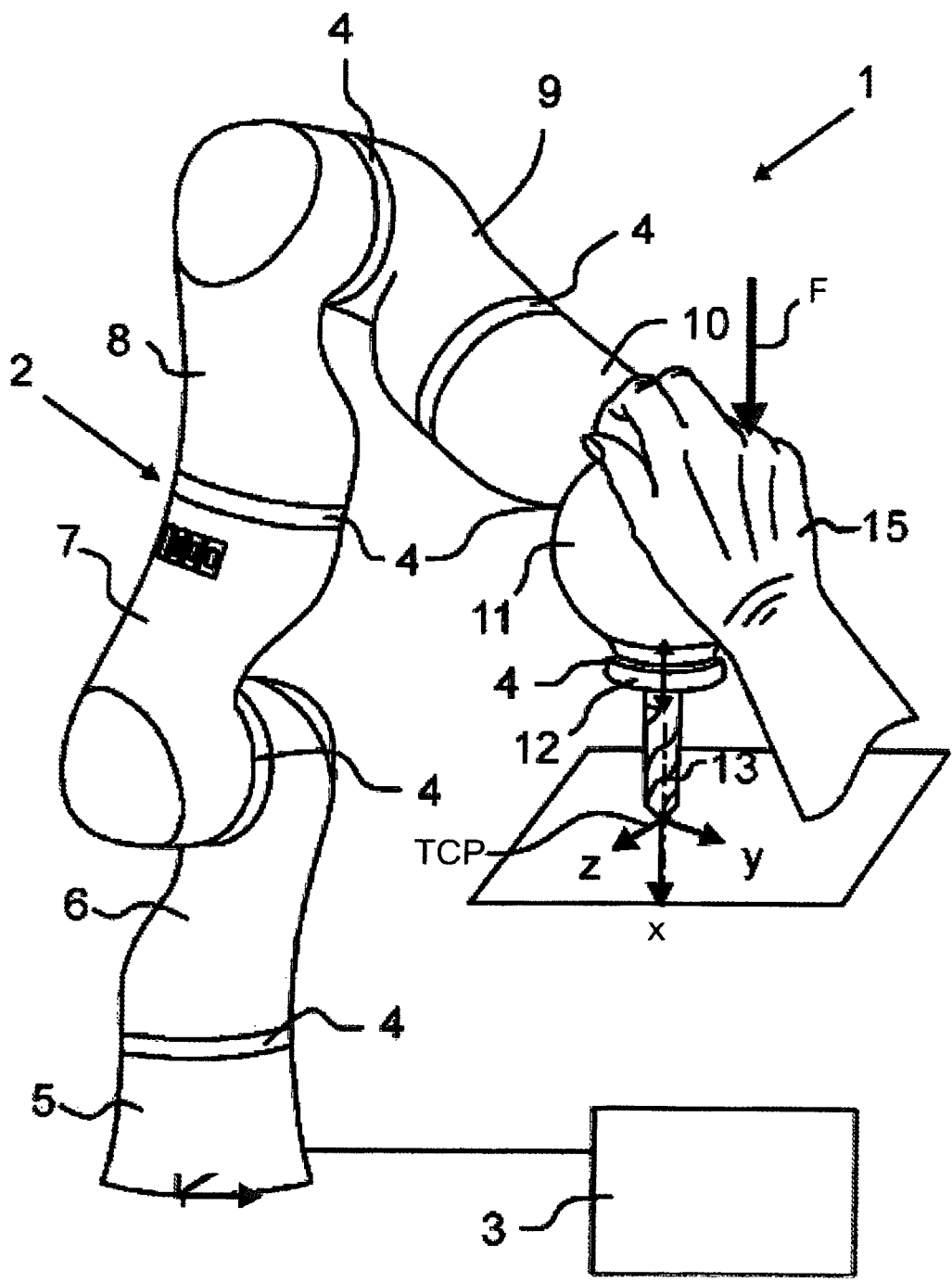
FIG. 1 depicts a robot assembly with a robot controller according to an exemplary embodiment of the present invention.

FIG. 1 shows a robot assembly 1 with a robot 2 and a robot controller 3 according to an exemplary embodiment of the present invention.

The robot comprises links 5-12, in particular a base 5 and an end-link in the form of a tool flange 12, which are connected to one another in pairs by means of seven actuated pivot joints 4; the robot is thus kinematically redundant.

In the design example, by way of example, the robot guides a tool 13 and comprises a robot-fixed reference in the form of its TCP with the reference coordinate axes x (in the direction of the tool axis or in the longitudinal or the impact direction of the tool) y, z (perpendicular to one another and to the x axis).

The robot 2 is controlled by the controller 3 in a yieldable, for example impedance-controlled manner.

Figure 2:
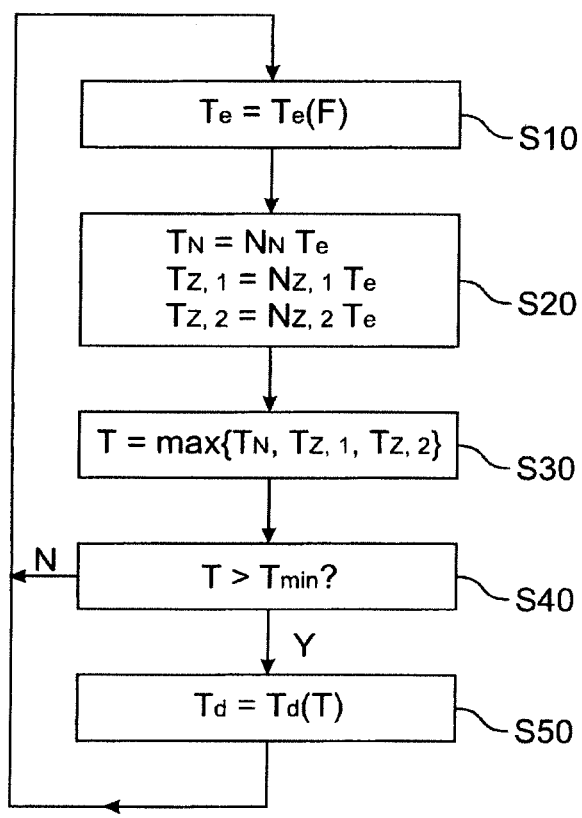
FIG. 2 depicts a method for the manually guided movement of the robot according to an exemplary embodiment of the present invention.

In doing so, the controller 3 executes a method for the manually guided movement of the robot according to an exemplary embodiment of the present invention explained in the following with reference to FIG. 2, and/or is programmed to execute this method by means of an appropriate computer program product.

In a first step S10, on the basis of forces in the form of torques in the joints 4 of the robot 2, which are recorded by means of torque sensors, for example, or on the basis of motor currents, and a model of the robot, which models the torques occurring in the joints 4 as a result of the mass, inertia and friction of the robot, the controller 3 determines the joint forces $T_e$, which are impressed by a user 15 manually exerting an external force F on the robot: $T_e = T_e(F)$. To do this, the controller subtracts the joint forces determined on the basis of the model from the recorded joint forces, for example. The force F could also be measured by means of a six-axis force (torque) sensor, for example, and projected into the joint coordinate space via the Jacobian matrix J on the basis of the joint angles $q_1 \ldots q_7$.

In a second step S20, the controller determines the component $T_N$ of the joint forces $T_e$ impressed by the external force, which seeks to effect or effects a movement of the robot 2 only in its kinematic null space, i.e. without changing the location and orientation of its end-link 12.

To do this, the controller 3 determines the transposed Jacobian matrix $$J^T = \begin{bmatrix} \frac{\partial X}{\partial q_1} & \cdots & \frac{\partial X}{\partial q_7} \\ \frac{\partial Y}{\partial q_1} & \cdots & \frac{\partial Y}{\partial q_7} \\ \frac{\partial Z}{\partial q_1} & \cdots & \frac{\partial Z}{\partial q_7} \\ \frac{\partial \alpha}{\partial q_1} & \cdots & \frac{\partial \alpha}{\partial q_7} \\ \frac{\partial \beta}{\partial q_1} & \cdots & \frac{\partial \beta}{\partial q_7} \\ \frac{\partial \gamma}{\partial q_1} & \cdots & \frac{\partial \gamma}{\partial q_7} \end{bmatrix}^T$$

with the location (X, Y, Z) and orientation ($\alpha$, $\beta$, $\gamma$) of the TCP and the joint angle $q_1, \ldots, q_7$ of the seven joints 4, the transposed Moore-Penrose pseudoinverse $J^{+t}$, from this the projection $N_N = 1 - J^T \cdot J^{+t}$ into this subspace of the joint coordinate space with the unit matrix 1, and hence the component $T_N = N_N \cdot T_e$.

In addition, in the second step S20, the controller determines the component $T_{Z,1}$ of the joint forces $T_e$, which seeks to effect or effects a movement of the robot 2 only in a first further subspace of the joint coordinate space of the robot that is predetermined by a restricted movement capacity of the TCP along the x-coordinate axis of the TCP.

To do this, the controller 3 determines the correspondingly reduced transposed Jacobian matrix $$J_{Z,1}^T = \begin{bmatrix} \frac{\partial Y}{\partial q_1} & \cdots & \frac{\partial Y}{\partial q_7} \\ \frac{\partial Z}{\partial q_1} & \cdots & \frac{\partial Z}{\partial q_7} \\ \frac{\partial \alpha}{\partial q_1} & \cdots & \frac{\partial \alpha}{\partial q_7} \\ \frac{\partial \beta}{\partial q_1} & \cdots & \frac{\partial \beta}{\partial q_7} \\ \frac{\partial \gamma}{\partial q_1} & \cdots & \frac{\partial \gamma}{\partial q_7} \end{bmatrix}^T,$$

from this, with the corresponding transposed Moore-Penrose pseudoinverse $J_{Z,1}^{+T}$, the projection $N_{Z,1} = [1 - J_{Z,1}^T \cdot J_{Z,1}^{+T}] \cdot J^T \cdot J^{+T}$ into this first further subspace of the joint coordinate space, and hence the component $T_{Z,1} = N_{Z,1}' T_e$.

In addition, in the second step S20, the controller also determines the component $T_{Z,2}$ of the joint forces $T_e$, which seeks to effect or effects a movement of the robot 2 only in a second further subspace of the joint coordinate space of the robot that is predetermined by a restricted movement capacity of the TCP in or on the y-z-coordinate plane of the TCP.

To do this, the controller 3 determines the correspondingly reduced transposed Jacobian matrix $$J_{Z,2}^T = \begin{bmatrix} \frac{\partial X}{\partial q_1} & \cdots & \frac{\partial X}{\partial q_7} \\ \frac{\partial \alpha}{\partial q_1} & \cdots & \frac{\partial \alpha}{\partial q_7} \\ \frac{\partial \beta}{\partial q_1} & \cdots & \frac{\partial \beta}{\partial q_7} \\ \frac{\partial \gamma}{\partial q_1} & \cdots & \frac{\partial \gamma}{\partial q_7} \end{bmatrix}^T,$$

from this, with the corresponding transposed Moore-Penrose pseudoinverse $J_{Z,2}^{+T}$, the projection $N_{Z,2} = [1 - J_{Z,2}^T \cdot J_{Z,2}^{+T}] \cdot J^T \cdot J^{+T}$ into this second further subspace of the joint coordinate space, and hence the component $T_{Z,2} = N_{Z,2}' T_e$.

In a step S30, the controller 3 now determines the largest component T of these components $T_N$, $T_{Z,1}$ and $T_{Z,2}$: $T = \max\{T_N, T_{Z,1} \text{ and } T_{Z,2}\}$, wherein the amount standard $\|T_N\|^2$, for example, can be used as the value of a component $T_u$.

If the first further component $T_{Z,1}$ is the largest, for example, it means that the user 15 is, so to speak, pushing the hardest in the direction of the x-axis of the TCP. From this, the controller 3 can recognize that a hand-guided movement is desired only in this subspace of the joint angle space.

If, on the other hand, the second further component $T_{Z,2}$ is the largest, it means that the user 15 is, so to speak, pushing the hardest in the direction of the y-z plane of the TCP. From this, the controller 3 can recognize that a hand-guided movement is desired only in this subspace of the joint angle space.

If, commensurately, the component $T_N$ is the largest, it means that the force F applied by the user 15, so to speak, acts most strongly in the kinematic null space of the robot 2; the elbow is repositioned when the TCP is fixed, for example. From this, the controller 3 can recognize that a hand-guided movement is desired only in the kinematic null space of the robot 2.

Additional subspaces can be tested in an analogous manner.

Additionally or alternatively, it is also possible to compare the component $T_N$ in the kinematic null space of the robot 2 with the joint forces themselves, for example, and to decide, based on this, whether a hand-guided movement in the kinematic null space or a hand-guided movement of the TCP is being input.

A hand-guided movement in the kinematic null space can thus be detected, for example, if an evaluation variable $H = \|T_N\|/\|T_e\|$ exceeds a predetermined limit value.

It can be seen that the reduced Jacobian matrices advantageously respectively result from the elimination of the corresponding restricted movement capacity (capacities) of the TCP. In a modification, the reduced Jacobian matrix can alternatively also describe only the corresponding restricted movement capacity of the TCP, i.e.

$$J_{Z,1}^T = \begin{bmatrix} \frac{\partial X}{\partial q_1} & \cdots & \frac{\partial X}{\partial q_7} \end{bmatrix}^T$$

with a correspondingly adapted projection.

In a step S40 then, the controller compares the component T found in this manner with a predeterminable threshold value $T_{min}$. If the component T is larger than said value (S40: "Y"), the input command is implemented in a step S50 by determining target torque $T_d$ of the drives of the joints 4 of the robot 2 on the basis of the component T; for example in proportion to this component T. The method subsequently returns to step S10.

If the largest component T remains below the threshold value $T_{min}$ as well (S40: "N"), a command input by means of the manually exerted external force F is rejected, and the method returns directly to step S10.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 robot assembly
2 robot 3 robot controller
4 (pivot) joint
5 base
6-11 robot link
12 tool flange (end-link)
13 tool
15 user
F external force
$T_d$ target torque (input command)
$T_e$ joint forces impressed by the external force
$T_{min}$ threshold value
$T_N$; $T_{Z, 1}$; $T_{Z, 2}$; components in a subspace
TCP tool center point

What is claimed is:

1. A method for automatically determining an input command for a robot, the method comprising:
  detecting with a robot controller an external force that is manually exerted on the robot;
  determining with the robot controller the input command on the basis of a component of the joint forces impressed by the external force which seeks to effect a movement of the robot only in a subspace of the joint coordinate space of the robot which is specific to the input command.

2. The method of claim 1, wherein the input command comprises a movement command for moving the robot in the input command-specific subspace.

3. The method of claim 1, wherein the input command is determined as an input command to be implemented only when the component of the joint forces impressed by the external force exceeds a predetermined threshold value.

4. The method of claim 1, wherein:
  the input command is determined from at least two possible input commands having different subspaces of the joint coordinate space that are specific to the respective possible input commands; and
  wherein determining the input command comprises determining the possible input command having the larger component of the joint forces impressed by the external force in the input command-specific subspace.

5. The method of claim 1, wherein an input command specific-subspace of the joint coordinate space of the robot is a kinematic null space of the robot in which the robot can be moved without changing its end-link position.

6. The method of claim 1, wherein at least one input command-specific subspace of the joint coordinate space of the robot is predetermined by a user-defined restricted movement capacity of the robot in a working space of possible poses of the robot.

7. The method of claim 6, wherein at least one of:
  the at least one input command-specific subspace is predetermined by a user-defined restricted movement capacity of a robot-fixed reference; or
  the working space of possible poses comprises at least one of possible locations or possible orientations of a robot-fixed reference.

8. The method of claim 6, wherein the user-defined restricted movement capacity of at least one input command-specific subspace of the robot includes at least one of:
  a translation along a path;
  a translation on a surface; or
  a rotation about one, two or three axes.

9. The method of claim 8, wherein the user-defined restricted movement capacity includes at least one of:
  translation along a straight path;
  translation along a coordinate axis of a robot-fixed reference;
  translation on a flat surface;
  translation on a coordinate plane of the robot-fixed reference; or
  rotation about coordinate axes of the robot-fixed reference.

10. The method of claim 1, wherein the joint forces impressed by the external force are determined on the basis of at least one of a model or forces recorded in joints of the robot.

11. The method of claim 1, wherein the component of the joint forces impressed by the external force which seeks to effect a movement of the robot only in a predetermined subspace of the joint coordinate space of the robot is determined on the basis of a mathematical projection of the joint forces in the subspace.

12. The method of claim 11, wherein the component of the joint forces is determined on the basis of a pseudoinverse.

13. The method of claim 1, wherein the robot comprises at least seven joints.

14. A method for manually guided movement of a robot, the method comprising:
  automatically determining a movement command input to the robot by manual application of an external force according to claim 1; and
  executing the determined movement command.

15. Robot controller comprising a non-transitory storage medium including program code that, when executed by the robot controller, causes the computer to:
  detect an external force that is manually exerted on a robot;
  determine an input command on the basis of a component of joint forces impressed by the external force which seeks to effect a movement of the robot only in a subspace of a joint coordinate space of the robot which is specific to the input command.

16. A robot assembly, comprising
  a robot having a plurality of joints; and
  a robot controller according to claim 15.

17. A computer program product including a program code stored in a non-transitory computer-readable medium, the program code, when executed by a robot controller, causing the robot controller to:
  detect an external force that is manually exerted on a robot;
  determine an input command on the basis of a component of joint forces impressed by the external force which seeks to effect a movement of the robot only in a subspace of a joint coordinate space of the robot which is specific to the input command.

* * * * *